United States Patent [19]
Sutherland et al.

[11] 3,876,056
[45] Apr. 8, 1975

[54] PADDLE WHEEL FEED ASSIST FOR VERTICAL AUGER CONVEYOR

[75] Inventors: Gail Russell Sutherland; John Edward Maust, Jr., both of Des Moines, Iowa

[73] Assignee: Deere and Company, Moline, Ill.

[22] Filed: May 21, 1973

[21] Appl. No.: 361,935

[52] U.S. Cl. .................. 198/25; 56/107; 198/104
[51] Int. Cl. .............................................. B65g 47/00
[58] Field of Search ............... 198/104, 82, 7, 25; 56/103, 105, 107; 222/178

[56] References Cited
UNITED STATES PATENTS

| | | | |
|---|---|---|---|
| 2,302,460 | 11/1942 | Osgood | 198/104 X |
| 2,756,862 | 7/1956 | Creed | 198/25 X |
| 2,854,125 | 9/1958 | Johnson | 198/104 |

*Primary Examiner*—Evon C. Blunk
*Assistant Examiner*—Douglas D. Watts

[57] ABSTRACT

On a root crop harvester including a vertically extending auger rotatable within a housing for advancing roots upwardly therethrough, and a horizontal conveyor for advancing roots toward and through an opening in the lower end of the auger housing, a paddle wheel feeder for assisting in feeding roots from the horizontal conveyor into the auger housing, the feeder including a shaft rotatably supported above the horizontal conveyor and outwardly from the opening in the housing, and a plurality of resilient paddles fixed to the shaft and extending radially therefrom at circumferentially spaced intervals, the outer ends of the paddles being movable through a circular path including an arcuate portion extending upwardly and toward the opening in the housing.

11 Claims, 5 Drawing Figures

PADDLE WHEEL FEED ASSIST FOR VERTICAL AUGER CONVEYOR

BACKGROUND OF THE INVENTION

The present invention relates generally to conveying apparatus and more particularly to means for assisting in feeding objects into the housing of a vertical auger conveyor.

A beet harvester which utilizes a vertically extending auger for elevating harvested beets is disclosed in co-pending U.S. application Ser. No. 318,095, filed 26 Dec. 1972 now U.S. Pat. No. 3,771,651. It has been found that a primary problem in conveying beets by means of such a vertical auger lies in initially feeding them through the inlet opening in the auger housing, since the rotating auger flight tends to kick beets back out through the upper portion of the inlet opening with the result that a certain portion of the beets must be recirculated through the opening. In addition to the undesirable reduction in conveying efficiency which results from such recirculation physical damage to the beets being conveyed is also a significant problem associated with feeding beets into a vertical auger conveyor. This problem, again, is a result of the tendency of the auger flight to expel beets outwardly from the housing through the upper portion of the inlet opening. Those beets which are only partially, rather than completely, expelled through the opening may become wedged between the upper edge of the opening and the auger flight as the latter advances upwardly past the former, and become severed by the scissor action of these elements. Those beets which are completely expelled and accumulate in the area just outwardly of the opening aggravate the damage problem, since they prevent other beets from being completely expelled.

SUMMARY OF THE INVENTION

Accordingly, it is the primary object of the present invention to provide apparatus for assisting in feeding objects through the inlet opening in the housing of a vertical auger conveyor and thereby increasing the conveying efficiency of the auger. It is a further object to provide apparatus which is operative to eliminate or substantially reduce damage caused to objects which are partially expelled through the inlet opening by the auger flight. More specifically, it is an object of the invention to provide apparatus which is operative to prevent objects from being expelled through the upper portion of the inlet opening in the auger housing by the auger flight. It is yet a further object to provide such apparatus which is simple and reliable in operation and economical to manufacture.

In pursuance of these and other objects the invention comprises, generally, a paddle wheel feed mechanism for assisting in feeding objects through the inlet opening in a vertical auger conveyor, the mechanism being mounted near the inlet opening in the auger housing at the juncture of the housing and the conveyor which feeds objects toward and through the opening. The mechanism comprises a shaft rotatably supported above the feed conveyor and outwardly from the inlet opening, and a series of resilient paddles secured to and extending radially from the shaft at circumferentially spaced intervals. The shaft is disposed so that upon rotation thereof, the outer ends of the paddles travel through a circular parth including an arc extending upwardly and toward the opening in the auger housing. The paddles are thus operative to engage beets which may be partially expelled from the housing and force them back through the opening before they become wedged between the upper edge of the opening and the auger flight.

In the embodiment of the invention disclosed, the auger housing is cylindrically shaped in the area of the inlet opening, and the outer edges of the paddles are arcuately shaped to conform to the shape of the housing, so that the entire edge of the paddle passes in close proximity to the upper edge of the inlet opening as the shaft is rotated. Each paddle is formed of a plurality of resilient strips fixed to the shaft at axially spaced intervals.

BRIEF DESCRIPTION OF THE DRAWINGS

The preferred embodiment of the invention will be described in conjunction with the accompanying drawings in which.

DESCRIPTION OF THE PREFERRED EMBODIMENT

Figure 1:
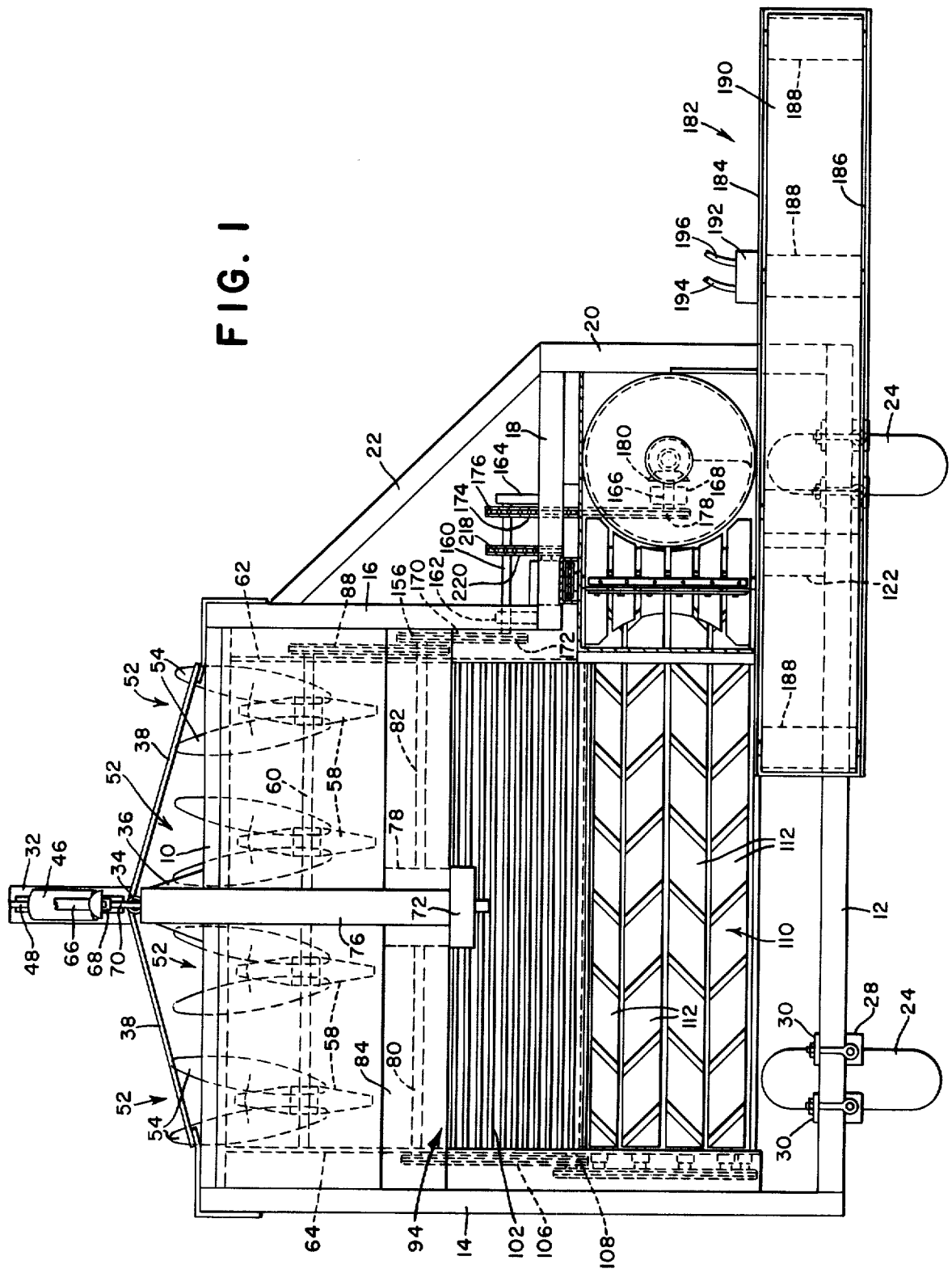
FIG. 1 is a plan view of a beet harvester incorporating the paddle wheel feed assist of the invention.

Referring now to the drawings, the paddle wheel feed apparatus of the invention is illustrated as incorporated in a beet harvester having a main supporting framework composed of a front transverse frame member 10, a rear transverse frame member 12, a left longitudinal side frame member 14 connecting the left ends of the front and rear frame members, a first right longitudinal side frame member 16 connected to and extending rearwardly from the right end of the front frame member, a transverse frame member 18 connected to the rear end of the member 16 and extending outwardly therefrom, a second right longitudinal side frame member 20 connecting the right ends of the frame members 18 and 12, and a diagonal brace member 22 connecting a forward portion of the member 16 with the front end of the member 20. The rear of the frame is supported by a pair of ground-engaging wheels 24 mounted in a transversely adjustable manner on the rear transverse frame member 12. Each wheel 24 is rotatably supported on an axle 26 which extends between the legs of a U-shaped support member or fork 28. Each fork 28 is connected to the rear transverse frame member 12 by a pair of clamp assemblies 30 which are releasable to permit lateral adjustment of the fork on the frame member 12 so that the wheels 24 may be positioned to accommodate various row spacings.

The forward end of the main frame is supported by a hitch member 32 shown fragmentarily in the drawings and adapted at its forward end for connection to the drawbar of a tractor. The rear of the hitch member 32 is connected to the main frame for relative pivotal movement about both vertical and transverse axes. The vertical axis is defined by a shaft 34 (see FIG. 1) which is supported on the front frame member 10 by a pair of generally triangular, vertically spaced plates 36 which are connected to and extend forwardly from the frame member 10, and a pair of brace members 38 which are connected to opposite sides of the member 10 and converge forwardly to the apex of the triangular plates 36. Pivot members 40 and 42 are fixed to the upper and lower ends, respectively, of the pivot shaft 34 and are rotatable therewith. The rear end of the hitch member 32 is connected to the lower member 42 for vertical pivotal movement about a connecting pin 44. The vertical position of the hitch relative to the main frame is adjusted by means of a hydraulic cylinder 46 which interconnects a bracket 48 secured to the top side of the hitch member 32 and a bracket 50 on the front side of the member 40. The lateral position of the hitch member 32 about the pivot shaft 34 is controlled by a conventional row finder unit and hydraulic cylinder which are not shown in the drawings since they form no part of the present invention.

Mounted on the front transverse frame member 10 and movable vertically therewith into and out of engagement with the ground are a plurality of transversely spaced digger wheel units 52, each unit comprising a cooperating pair of digger wheels 54 rotatably supported on opposite sides of a vertical standard 56 connected at its upper end of the front frame member 10 for relative lateral adjustment. The digger wheel units are adjustable relative to the frame member 10 to accommodate various row spacings. Associated with each digger wheel unit 52 is a paddle wheel 58 which extends between the upper rear portions of the wheels 54. The paddle wheels 58 are supported on a common transverse shaft 60 which is rotatably supported at opposite ends in vertical support plates 62 and 64 on the right and left sides, respectively, of the frame. The paddle wheels are mounted on the shaft 60 so that they can be adjusted laterally with their associated digger wheel units.

Figure 2:
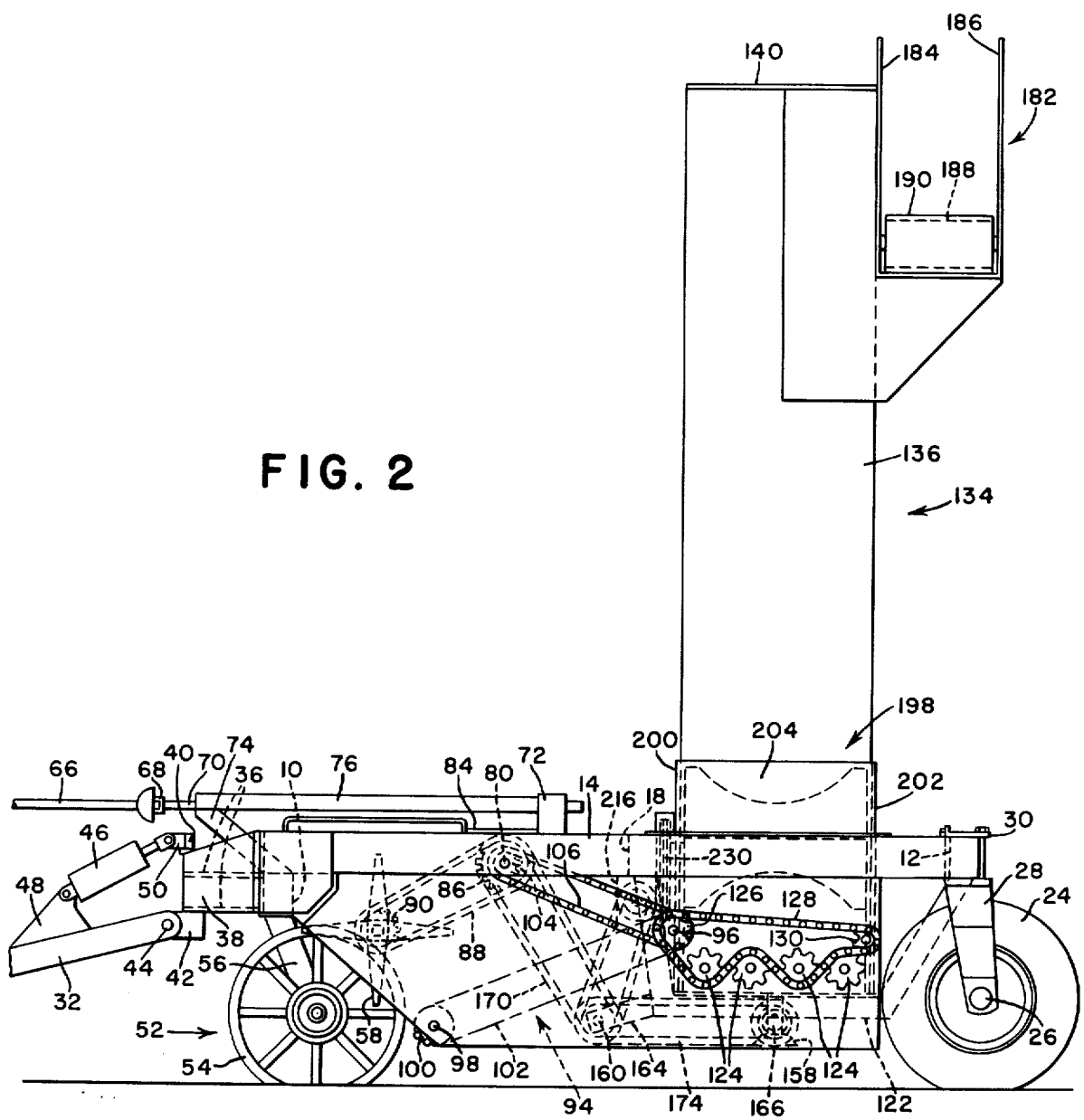
FIG. 2 is a left side elevational view of the beet harvester shown in FIG. 1.
Figure 5:
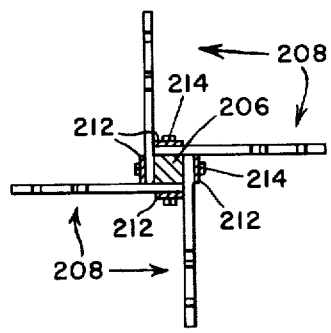
FIG. 5 is a sectional view taken along the line 5—5 of FIG. 3.

The paddle wheels 58 are driven in a counterclockwise direction as viewed in FIG. 2 by the shaft 60 to engage and advance rearwardly beets removed from the ground by the digger wheels 54. Power is supplied for driving the shaft 60, as well as for driving the other operating components on the harvester which have not yet been described, from the power take-off shaft of the tractor. A first shaft 66 is connected at its forward end to the tractor power take-off shaft (not shown) and at its rearward end by means of a universal connection 68 to the forward end of a frame supported shaft 70. The shaft 70 is rotatably supported at its rear end in a transfer box 72 and its forward end is journaled on a support member 74 fixed to the front frame member 10. An inverted U-shaped shield 76 covers the shaft 70. A chain in the transfer box 72 transmits power from the rear end of the shaft 70 to the input shaft of a gear box 78 which in turn drives a pair of shafts 80 and 82 extending transversely outwardly from the gear box 78 and journaled at their outer ends in support plates 64 and 62, respectively. The gearing within the gear box 78 is arranged so that the shafts 80 and 82 are driven in opposite directions, the shaft 80 being driven in a clockwise direction as viewed in FIG. 2 and the shaft 82 being driven in a counterclockwise direction when viewed in the same manner. The shafts 80 and 82 are covered by a shield 84 which extends transversely between the frame members 14 and 16 and serves also as a support for the gear box 78. A sprocket 86 is mounted on the right end of the shaft 82 and is drivingly connected by means of a chain 88 with a sprocket 90 on the extreme outer end of the paddle wheel support shaft 60, to drive the latter and thereby the paddle wheels in a counterclockwise direction as viewed in FIG. 2.

In operation, the paddle wheels 58 are thus operative to engage beets which have been lifted from the ground by the digger wheels 54 and advance them rearwardly. The beets are delivered by the paddle wheels to a chain conveyor designated generally by the numeral 94 which extends transversely between the support plates 62 and 64 and upwardly and rearwardly from a point directly behind the digger wheel units 52. The conveyor 94 includes upper and lower transverse shafts 96 and 98, respectively, which extend between and are journaled on the support plates 62 and 64. A plurality of sprockets 100 are mounted on the shafts 96 and 98 and engage an endless conveyor chain 102 to drive the same in a clockwise direction as viewed in FIG. 2. Power is transmitted to the chain conveyor 94 from a sprocket 104 on the left end of the shaft 80 by means of a chain 106 which drivingly connects the sprocket 104 with a sprocket mounted at 108 on the left end of the upper conveyor shaft 96. In operation, the shaft 96 and thereby the conveyor chain 102 is driven by the shaft 80 in a clockwise direction as viewed in FIG. 2, and the chain conveyor 94 is thus operative to receive beets delivered rearwardly by the paddle wheels 58 and convey the same upwardly and rearwardly.

The beets conveyed rearwardly by the conveyor 94 are deposited on the second conveyor 110 which extends transversely across the rear of the machine. The conveyor 110 is composed of four conventional grab rolls 112, each of which includes a cylindrical tube 114 and a spiral rod 116 which winds around and is secured to the outer surface of the tube 114. Supported centrally within and extending through opposite ends of each tube 114 is a shaft 118, the left ends of the shafts 118 being rotatably supported by the plate 64 and the right ends thereof being rotatably supported in brackets 120 which are fixed to and extend upwardly from a longitudinal brace 122 which connects the frame members 12 and 18. A sprocket 124 is mounted on the extreme left end of each shaft 118, and each of the sprockets 124 is connected to a sprocket 126 on the extreme left end of the upper conveyor shaft 96 by a drive chain 128. As shown in FIG. 2, the chain 128, which additionally engages an idler sprocket 130 supported from the plate 64, is trained around the four sprockets 124 so as to drive alternate rolls in opposite directions. As the grab rolls are rotated, the spiral rods 116 act to advance the beets deposited on the conveyor transversely toward the right side of the machine. At the same time, dirt and other debris clinging to the beets is removed by the counterrotating action of the rolls and is discharged downwardly therebetween to fall to the ground.

Beets conveyed toward the right side of the machine by the grab rolls 112 are delivered through an inlet opening 132 in the bottom end of a vertically extending auger housing 134. The housing 134, which encloses a vertical auger conveyor 135, is supported between the frame members 12 and 18 just inwardly of the frame member 20, and includes a vertically extending cylindrical wall 136, a horizontal floor 138, and a top wall 140. The inlet opening 132 is formed in the lower end of the cylindrical wall 136 and is defined by a top edge 142 which extends 180° around the cylindrical wall 136 and lies in a plane perpendicular to the axis of the auger 135, front and rear vertical edges 144 and 146, respectively, and the floor 138. The auger 135 includes a cylindrical core tube 148 having spiral flighting 150 secured to the outer surface thereof, and a shaft 152 contained centrally within the tube 148. The lower end of the shaft 152 is journaled in a bearing member 154 mounted on the floor 138 of the housing 134, and the upper end of the shaft is rotatably supported in the top wall 140 of the housing.

Figure 3:
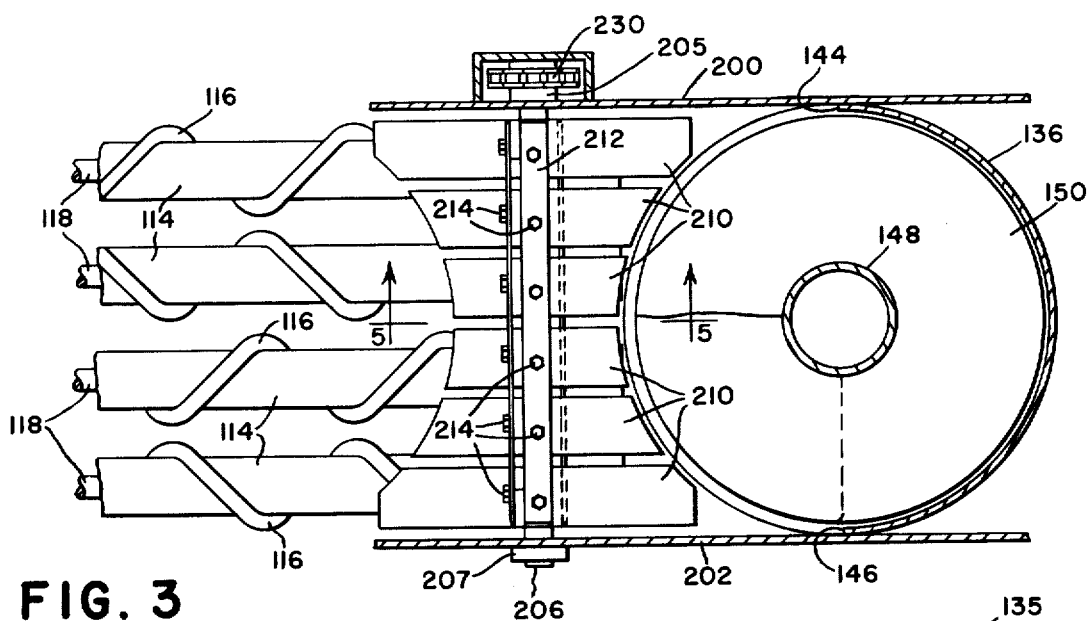
FIG. 3 is an enlarged plan view of the paddle wheel feed assist with portions broken away for the sake of clarity.

The auger 135 is rotated in a counterclockwise direction as viewed in FIGS. 1 and 3 to convey the beets delivered through the inlet opening 132 upwardly through the housing 134 by drive means which drivingly connect a sprocket 156 on the extreme right end of the shaft 82 with a bevel gear 158 on the lower end of the auger shaft 152. The drive means includes a first transverse shaft 160 which extends beneath the longitudinal frame member 16 and is rotatably supported at its left end of the lower end of a bracket 162 which is fixed to and projects downwardly from the lower side of the member 16, and at its right end in a bracket 164 which is fixed to the front side of the frame member 18 and extends downwardly and forwardly therefrom. The drive means further includes a second transverse shaft 166 which is supported in a bracket 168 mounted on the underside of the auger housing floor 138. A first chain 170 drivingly connects the sprocket 156 on the shaft 82 with a sprocket 172 on the left end of the first transverse shaft 160, and a second chain 174 connects a sprocket 176 on the right end of the shaft 160 with a sprocket 178 on the left end of the second transverse shaft 166. A bevel gear 180 on the right end of the shaft 166 meshes with the bevel gear 158 on the lower end of the auger shaft to complete the drive connection.

Supported on the upper end of the housing 134 is a transverse conveyor designated generally by the numeral 182. The conveyor 182 includes a supporting framework having a pair of upright walls 184 and 186 and an endless belt-type conveyor disposed between the lower portions of the walls and including a plurality of rollers 188 extending between and journaled in the walls 184 and 186, and an endless flexible conveying element 190 drivingly trained around the rollers 188. Power is furnished for driving the conveyor 182 by a hydraulic motor 192 which drives one of the rollers 188. The hydraulic motor 192 is supplied with hydraulic fluid under pressure from a source on the tractor through hydraulic lines 194 and 196. In operation, beets conveyed upwardly by the vertical auger 135 are discharged rearwardly through an opening in the upper end of the housing 134 which communicates with an opening in the wall 184 of the transverse conveyor support, onto the upper run of the conveying element 190. The element 190 is operative to convey the beets transversely to the right end of the conveyor 182, where they are dropped into a suitable receptacle, which conventionally consists of a box on a truck driven alongside the harvester.

A housing 198 for the feed assist apparatus of the invention is formed at the lower end of the vertical auger housing 134 adjacent to the upper edge of the inlet opening 132 therein and directly above the right end of the transverse conveyor 110, the housing including a pair of generally planar front and rear walls 200 and 202, respectively, and an arcuate top wall 204 which connects the upper and forward edges of the walls 200 and 202 and is in turn connected to the auger housing wall 136. Extending longitudinally through the housing 198 between the walls 200 and 202 is a square shaft 206 which is rotatably supported at opposite ends in bearings 205 and 207 on the walls 200 and 202, respectively. As shown in the drawings, the axis of the shaft 206 is perpendicular to a vertical plane containing the axis of the auger 135, and lies in the horizontal plane containing the upper edge 142 of the auger housing inlet opening 132.

A paddle designated generally by the numeral 208 is connected to each of the flat sides of the square shaft 206 and extends outwardly from the axis thereof. Each of the four paddles 208 is composed of a plurality of resilient members 210 which are held securely against one side of the shaft 206 by means of a flat metal strip 212. A series of fasteners 214 extend through the strip 212, through each paddle member 208, through the shaft 206, and through the paddle and strip on the opposite side of the shaft to rigidly fix the inner ends of the resilient members to the shaft. As shown best in FIGS. 1 and 3, the outer edge of each paddle 208 has an arcuate shape which is concentric to the cylindrical housing 136 when the edge is disposed at its minimum distance from the wall.

Figure 4:
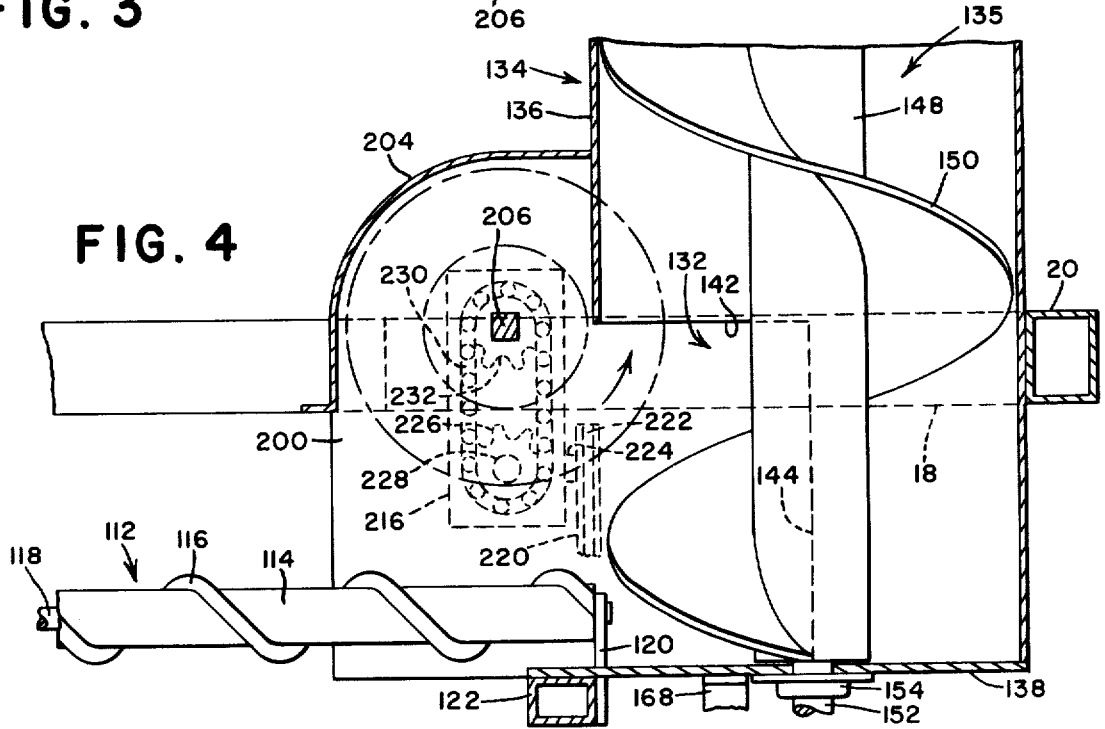
FIG. 4 is a rear elevational view of the mechanism shown in FIG. 3 with portions broken away for the sake of clarity.

Means for driving the paddle wheel feed assist apparatus is provided in the form of a gear box 216 mounted on the underside of the frame member 18, a sprocket 218 on the transverse shaft 160 which is connected by a chain 220 to a sprocket 222 on the input shaft 224 of the gear box 216, and a sprocket 226 on the output shaft 228 of the gear box which is connected by a chain 230 to a sprocket 232 on the forward end of the shaft 206. The gearing within the box 216 is arranged so that the paddle wheel apparatus is driven in a counterclockwise direction as viewed in FIG. 4. As shown in dotdash lines in FIG. 4, the outer edges of the paddles 208 travel around a circular path as the shaft 206 is rotated, the path including a portion which extends upwardly and toward the inlet opening 132 in the wall 136 of the auger housing. The paddles 208 pass in close proximity to the upper edge 142 of the inlet opening and are thus operative to engage beets which are expelled through the upper portion of the opening by the auger flight 150 and propel the same back into the housing 134. Beets which might otherwise be sheared between the upper edge 142 of the inlet opening 132 and the outer helical edge of the flighting 150 are instead safely returned to the confines of the housing wall 136. It will thus be appreciated that the paddle wheel feed assist apparatus both improves the conveying efficiency of the grab rolls 112 and vertical auger 135 since fewer beets are recirculated through the inlet opening 132, and thus substantially reduces damage to the beets resulting from such recirculation.

We claim:
1. In combination with a vertically extending auger; a housing for the auger having a side with an opening at the base thereof through which objects may be fed to the auger, the auger being rotatable to advance such objects received through said opening upwardly through the housing; and horizontally positioned conveyor means extending toward the opening in the housing and oriented to feed objects toward and through the opening; the improvement residing in apparatus for assisting the conveyor means in feeding objects through the opening and retaining objects in the housing at said opening, said apparatus comprising: a shaft rotatably supported above the conveyor means and outwardly of and alongside the housing; a plurality of paddles connected to the shaft and extending radially outwardly therefrom at circumferentially spaced interval; the shaft being disposed with its axis of rotation normal to the direction of movement of objects by the conveyor means and normal to the axis of rotation of the auger so that upon rotation thereof, the outer ends of the paddles move through a circular path including an arc extending upwardly and toward the opening in the wall of the housing, the paddles being operative to engage objects and first propel them inwardly through the opening and to thereafter retain them in the auger at said opening.

2. The invention defined in claim 1 wherein the opening in the housing wall has an upper edge which lies generally in a plane perpendicular to the axis of the auger, and wherein the axis of the shaft lies generally in said plane.

3. The invention defined in claim 1 wherein the paddles are composed of a resilient material.

4. The invention defined in claim 3 wherein the paddles are fixedly connected at their inner ends to the shaft.

5. The invention defined in claim 1 wherein each paddle comprises a plurality of axially spaced resilient members, each member being fixedly connected at its inner end to the shaft.

6. In a beet harvester including a vertically extending auger, a generally cylindrical housing for the auger having an opening in its side and at the base thereof through which beets may be fed to the auger, the auger being rotatable to advance beets upwardly through the housing; and a horizontal conveyor extending toward and terminating at the lower edge of the opening in the housing, the horizontal conveyor being oriented to feed beets toward and through the opening in the housing; the improvement residing in a horizontal paddle wheel feeder for assisting in feeding beets to the auger and retaining the beets in the auger comprising: a horizontal shaft rotatably supported directly above the horizontal conveyor and outwardly from the housing wall; and a plurality of resilient paddles connected to the shaft and extending radially outwardly therefrom at circumferentially spaced intervals, the shaft being disposed normal to the direction of movement of beets by the conveyor so that upon rotation thereof the outer ends of the paddles move through a circular path to which the side of the housing is generally tangentially disposed, the path including an arc extending upwardly and toward the opening in the wall of the housing.

7. The invention defined in claim 6 wherein the outer edge of each paddle defines an arc concentric to the cylindrical wall of the housing when the edge is disposed at its minimum distance from the wall.

8. The invention defined in claim 6 wherein the opening in the wall includes an upper edge which lies in the horizontal plane containing the axis of the shaft.

9. In combination with a vertically extending auger; a housing for the auger having a side with an opening at the base thereof through which objects may be fed to the auger, the auger being rotatable to advance such objects received through said opening upwardly through the housing; and conveyor means extending toward the opening in the housing and oriented to feed objects toward and through the opening; the improvement residing in apparatus for assisting the conveyor means in feeding objects through the opening and retaining objects in the housing at said opening, said apparatus comprising: a shaft rotatably supported above the conveyor means and outwardly of and alongside the housing, the axis of the shaft being generally perpendicular to a plane containing the axis of the auger; a plurality of paddles connected to the shaft and extending radially outwardly therefrom at circumferentially spaced intervals, the shaft being disposed generally normal to the direction of movement of objects by the conveyor means so that upon rotation thereof, the outer ends of the paddles move through a circular path including an arc extending upwardly and toward the opening in the walls of the housing, the paddles being operative to engage objects and propel them inwardly through the opening.

10. The invention defined in claim 9 wherein the housing wall has a cylindrical shape and the outer edge of at least one of the paddles defines an arc generally concentric to the housing wall when the edge is disposed at its minimum distance from the wall.

11. In combination with a vertically extending auger; a housing for the auger having a side with an opening at the base thereof through which objects may be fed to the auger, the auger being rotatable to advance such objects received through said opening upwardly through the housing; and conveyor means extending toward the opening in the housing and oriented to feed objects toward and through the opening; the improvement residing in apparatus for assisting the conveyor means in feeding objects through the opening and retaining objects in the housing at said opening, said apparatus comprising: a horizontal rotary paddle device rotatably supported above the conveyor means and alongside the housing at said opening, said rotor device including a shaft; and a plurality of paddles connected to the shaft and extending radially outwardly therefrom at circumferentially spaced intervals, the shaft being disposed normal to the direction of movement of objects by the conveyor means and normal to the axis of rotation of the auger so that upon rotation thereof, the underside of the device moves toward said opening and the paddles thereon move first in a cooperative sweeping relation with the conveying means to move the objects into the auger and from there in a cooperative alongside relation with the auger to prevent discharge of the objects at said opening.

* * * * *